United States Patent [19]

Hayden et al.

[11] Patent Number: 5,173,456
[45] Date of Patent: Dec. 22, 1992

[54] PHOSPHATE GLASS USEFUL IN HIGH ENERGY LASERS

[75] Inventors: Yuiko T. Hayden, Clarks Summit; Donna Guesto-Barnak, Dupont, both of Pa.

[73] Assignee: Schott Glass Technologies, Inc., Duryea, Pa.

[21] Appl. No.: 630,610

[22] Filed: Dec. 20, 1990

[51] Int. Cl.$^5$ .......................... C03C 3/16; C03C 3/19; C03C 3/17; C03C 3/062

[52] U.S. Cl. ......................................... 501/45; 501/47; 501/48; 501/73; 501/77; 501/78; 501/152; 252/301.4 P; 252/301.6 P

[58] Field of Search .................. 252/301.4 P, 301.6 P; 501/37, 45, 47, 48, 73, 78, 77, 152

[56] References Cited

U.S. PATENT DOCUMENTS 5,032,315  7/1991  Hayden et al. ............... 252/301.4 P Primary Examiner—William R. Dixon, Jr.
Assistant Examiner—Michael A. Marscheschi
Attorney, Agent, or Firm—Millen, White, Zelano and Branigan

[57] ABSTRACT

A low-or no-silica, low- or no-alkali phosphate glass useful as a laser amplifier in a multiple pass, high energy laser system having a high thermal conductivity, $K_{90°C.} > 0.85$ W/mK, a low coefficient of thermal expansion, $\alpha_{20°\text{-}300°C.} < 80 \times 10^{-7}/°C.$, low emission cross section, $\sigma < 2.5 \times 10^{-20}$ cm$^2$, and a high fluorescence lifetime, $\tau > 325$ μsecs at 3 wt. % Nd doping, consisting essentially of (on an oxide composition basis):

|  | Mole % |
|---|---|
| $P_2O_5$ | 52–72 |
| $Al_2O_3$ | 0–<20 |
| $B_2O_3$ | >0–25 |
| ZnO | 0–31 |
| $Li_2O$ | 0–5 |
| $K_2O$ | 0–5 |
| $Na_2O$ | 0–5 |
| $Cs_2O$ | 0–5 |
| $Rb_2O$ | 0–5 |
| MgO | >0–<30 |
| CaO | 0–20 |
| BaO | 0–20 |
| SrO | 0–<20 |
| $Sb_2O_3$ | 0–<1 |
| $As_2O_3$ | 0–<1 |
| $Nb_2O_5$ | 0–<1 |
| $Ln_2O_3$ | up to 6.5 |
| PbO | 0–<5 |
| $SiO_2$ | 0–3 | wherein
$Ln_2O_3$ is the sum of lanthanide oxides;
$\Sigma R_2O$ is <5, R being Li, Na, K, Cs, and Rb; the sum of $Al_2O_3$ and MgO is <24 unless $\Sigma R_2O$ is 0, then the sum of $Al_2O_3$ and MgO is <42; and the ratio of MgO to $B_2O_3$ is 0.48–4.20.

34 Claims, 7 Drawing Sheets

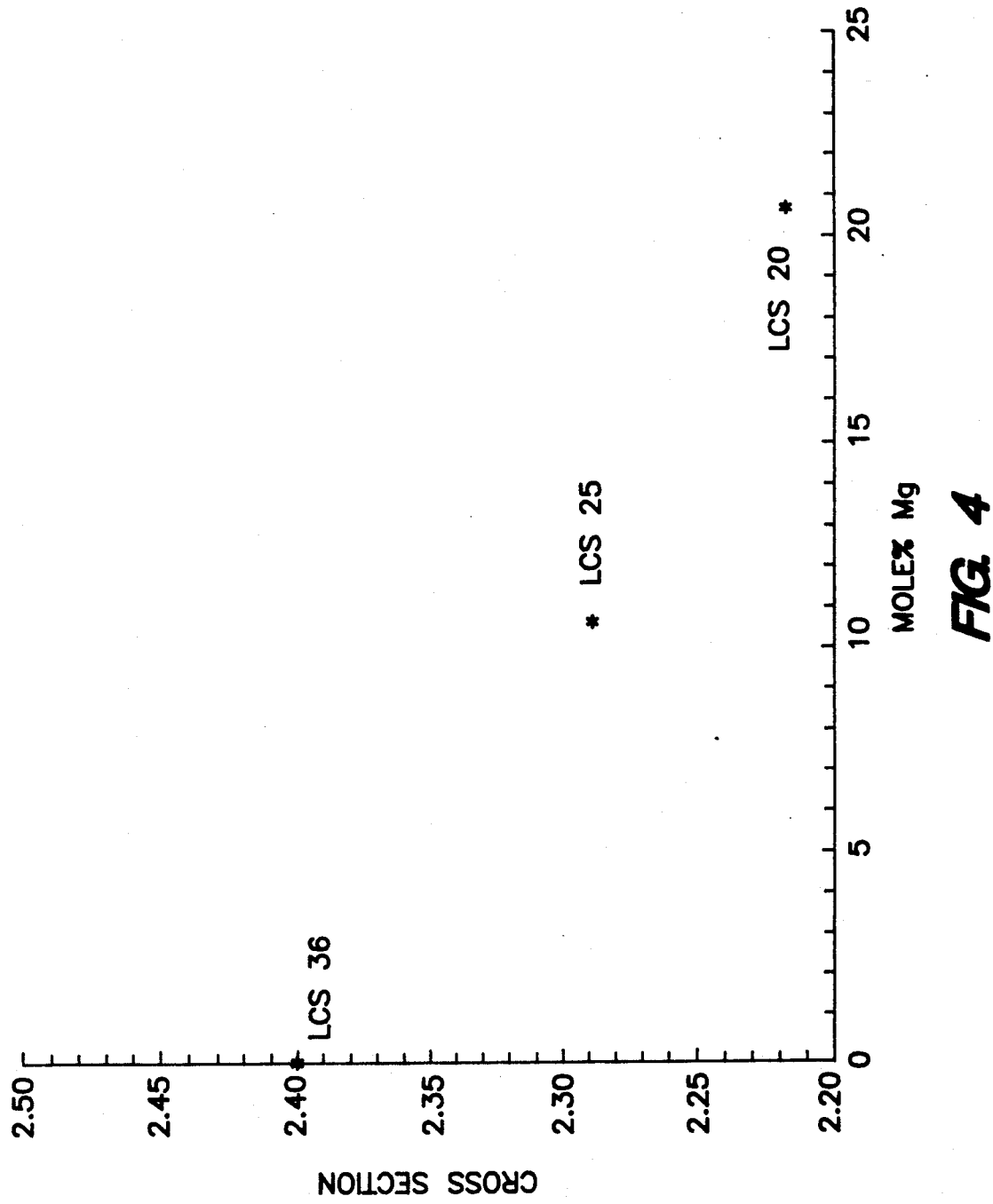

PHOSPHATE GLASS USEFUL IN HIGH ENERGY LASERS

The U.S. government has rights in this invention pursuant to Subcontract No. B063664 under Contract No. W-7405-ENG-48 awarded by the U.S. Department of Energy.

BACKGROUND OF THE INVENTION

This invention relates to phosphate laser glasses, typically neodymium-doped, having desirable cross section for stimulated emission for high energy use, high thermal conductivity and low thermal expansion, inter alia, in comparison to prior art and commercially available phosphate laser glasses. The invention especially relates to phosphate glass useful as a laser amplifier in a multipass, high energy laser system.

The term "laser" refers to the amplification of light by the stimulated emission of radiation. In a laser, a suitable active material, which can be a glass suitably doped with an active atomic species such as neodymium, is placed in a cavity resonator formed by two reflecting, or at least partially reflecting, walls.

Glasses for high average power use are required to withstand thermal heating due to high repetition rate, usually 5–10 Hz. These glasses also need high cross section for better efficiency.

On the other hand, high energy applications focus on the amount of energy stored in the amplifier to obtain very high energy (Tera Watts and higher). In such cases, factors which cause reduction in stored energy must be eliminated. These factors are ASE (amplified spontaneous emission) and PO (paracitic oscillation). The former becomes a serious problem when disc size increase; the effect increases as cross section increases. The latter is more a function of geometry. Thus, for high energy applications, glass must have a low cross section to reduce ASE, and high lifetime to maintain good efficiency despite its low cross section.

It is important for the application of large-aperture laser amplifiers that the active material be characterized by a low cross section for stimulated emission and long fluorescence lifetime of the excited state involved in the laser transition. In a large-aperture amplifier, in which the size of ASE becomes significant, a major effect is to reduce the fluorescence lifetime, which decreases the efficiency of pumping. Such a large ASE effect is accompanied with high cross section; therefore, it is necessary to have low cross section glass for this application in order to maintain high efficiency.

Good thermomechanical properties, such as low CTE and high thermal conductivity, lead to the ease of manufacturing laser glasses of good optical quality. These properties are advantageous for forming glass, annealing, processing, and also for general handling. These good thermomechanical properties also translate into a good thermomechanical figure of merit, FOM, given by:

$$FOM = \frac{SK(1-v)}{\alpha E}$$

where S is the fracture strength; $K_{90°\ C.}$, the thermal conductivity; $v$, Poisson's ratio; E, Young's modulus; and $\alpha$, the thermal expansion coefficient of the material. This is an important material characteristic when material is employed as high average power active material.

For a more detailed discussion of FOM, see U.S. Pat. No. 4,929,387.

Solid state laser materials are also more favorable for application in high energy laser systems if the active material can be produced in large sizes with high optical quality, high optical homogeneity, and in a form free of all inclusions which absorb radiation.

The inclusions could develop into damage sites within the material when the laser is operated at high power levels, leading ultimately to the active element being rendered useless as a laser material. It is always necessary that the glass have good manufacturability properties, e.g., devitrification stability.

It is known that phosphate laser glasses have a low threshold value for the laser effect; and phosphate compositions have been commercially available for some time as materials for use in laser systems in large sizes, with excellent optical quality and optical homogeneity. The quality of prior-art phosphate laser glasses recently has been extended by the introduction of new manufacturing technology capable of producing these compositions as glasses with levels of optical quality as good as that of previous glasses but which are now free of all absorbing inclusions which could develop into laser damage sites within the glass.

Nevertheless, a need has remained to further the development of phosphate compositions, e.g., achieve significantly lower emission cross section values in phosphate laser glasses, in order to reduce ASE, thus making available new compositions which are more attractive for use in high energy, large-aperture laser amplifier systems, while retaining the current state-of-the-art qualities which make doped phosphate glasses so useful as laser media.

Prior art phosphate glasses contain a wide variety of components including, for example, $Al_2O_3$, $SiO_2$, alkali metal oxides ($Na_2O$, $K_2O$, $Li_2O$, especially), alkaline earth metal oxides, etc., in addition to the base component $P_2O_5$. The prior art glasses having the best combination of the important thermal properties of thermal conductivity and coefficient of thermal expansion have typically been those containing necessary amounts of $SiO_2$. See, e.g., DE 3435133, JP 51-107312 and DE 3609247. These glasses typically have relatively low alumina contents.

Other phosphate laser glasses place no special emphasis on $SiO_2$ or even lack it entirely, e.g., U.S. Pat. Nos. 3,846,142; 4,248,732; 4,075,120; 4,239,645; 4,022,707; and 4,470,922; JP 51-59911, 62-18495, and 63-233024; DE 2924684 and 3340968; etc.

SUMMARY OF THE INVENTION

It has now been discovered that phosphate glasses suitable for use in lasers, especially high energy lasers, particularly for use as large-aperture laser amplifiers in such systems, and having a very desirable combination of low cross section, long lifetime, and other properties such as those mentioned above can be achieved.

Thus, in one aspect, this invention relates to a low- or no-silica, low- or no-alkali phosphate glass useful as a laser amplifier in a multiple pass, high energy laser system having a high thermal conductivity, $K_{90°\ C.} > 0.85$ W/mK, a low coefficient of thermal expansion, $\alpha_{20°\ ≧ 300°\ C.} < 80 \times 10^{-7}/°$ C., low emission cross section, $\sigma < 2.5 \times 10^{-20} cm^2$, and a high fluorescence lifetime, $\tau > 325$ μsecs at 3 wt.% Nd doping, consisting essentially of (on an oxide composition basis):

| | Mole % |
|---|---|
| $P_2O_5$ | 52-72 |
| $Al_2O_3$ | 0-<20 |
| $B_2O_3$ | 0-25 |
| ZnO | 0-31 |
| $Li_2O$ | 0-5 |
| $K_2O$ | 0-5 |
| $Na_2O$ | 0-5 |
| $Cs_2O$ | 0-5 |
| $Rb_2O$ | 0-5 |
| MgO | 0-<30 |
| CaO | 0-20 |
| BaO | 0-20 |
| SrO | 0-20 |
| $Sb_2O_3$ | 0-<1 |
| $As_2O_3$ | 0-<1 |
| $Nb_2O_5$ | 0-<1 |
| $Ln_2O_3$ | up to 6.5 |
| PbO | 0-<5 |
| $SiO_2$ | 0-3 | wherein
$Ln_2O_3$ is the sum of lanthanide oxides;
$\Sigma R_2O$ is <5, R being Li, Na, K, Cs, and Rb; and said glass substantially corresponds to a point within the shaded region of FIG. 1C.

According to another aspect, the invention relates to a low- or no-silica, low- or no-alkali phosphate glass useful as a laser amplifier in a multiple pass, high energy laser system having a high thermal conductivity, $K_{90°C.} > 0.85$ W/mK, a low coefficient of thermal expansion, $\alpha_{20°-300°C.} < 80 \times 10^{-7}/°$ C., low emission cross section, $\sigma < 2.5 \times 10^{-20}$ cm$^2$, and a high fluorescence lifetime, $\tau > 325$ µsecs at 3 wt. % Nd doping, consisting essentially of (on an oxide composition basis):

| | Mole % |
|---|---|
| $P_2O_5$ | 52-72 |
| $Al_2O_3$ | 0-<20 |
| $B_2O_3$ | >0-25 |
| ZnO | 0-31 |
| $Li_2O$ | 0-5 |
| $K_2O$ | 0-5 |
| $Na_2O$ | 0-5 |
| $Cs_2O$ | 0-5 |
| $Rb_2O$ | 0-5 |
| MgO | >0-<30 |
| CaO | 0-20 |
| BaO | 0-20 |
| SrO | 0-<20 |
| $Sb_2O_3$ | 0-<1 |
| $As_2O_3$ | 0-<1 |
| $Nb_2O_5$ | 0-<1 |
| $Ln_2O_3$ | up to 6.5 |
| PbO | 0-<5 |
| $SiO_2$ | 0-3 | wherein
$Ln_2O_3$ is the sum of lanthanide oxides;
$\Sigma R_2O$ is <5, R being Li, Na, K, Cs, and Rb;
the sum of $Al_2O_3$ and MgO is <24 unless $\Sigma R_2O$ is 0, then the sum of $Al_2O_3$ and MgO is <42; and
the ratio of MgO to $B_2O_3$ is 0.48-4.20.

According to a further aspect, the invention relates to a low- or no-silica, low- or no-alkali phosphate glass useful as a laser amplifier in a multiple pass, high energy laser system having a high thermal conductivity, $K_{90°C.} > 0.85$ W/mK, a low coefficient of thermal expansion, $\alpha_{20°-300°C.} < 80 \times 10^{-7}/°$ C., low emission cross section, $\sigma < 2.5 \times 10^{-20}$ cm$^2$, and a high fluorescence lifetime, $\tau > 325$ µsecs at 3 wt. % Nd doping, consisting essentially of (on an oxide composition basis):

| | Mole % |
|---|---|
| $P_2O_5$ | 52-72 |
| $Al_2O_3$ | 0-<20 |
| $B_2O_3$ | >0-25 |
| ZnO | 0-31 |
| $Li_2O$ | 0-5 |
| $K_2O$ | 0-5 |
| $Na_2O$ | 0-5 |
| $Cs_2O$ | 0-5 |
| $Rb_2O$ | 0-5 |
| MgO | >0-<30 |
| CaO | 0-20 |
| BaO | 0-20 |
| SrO | 0-<20 |
| $Sb_2O_3$ | 0-<1 |
| $As_2O_3$ | 0-<1 |
| $Nb_2O_5$ | 0-<1 |
| $Ln_2O_3$ | up to 6.5 |
| PbO | 0-<5 |
| $SiO_2$ | 0-3 | wherein
$Ln_2O_3$ is the sum of lanthanide oxides;
$\Sigma R_2O$ is <5, R being Li, Na, K, Cs, and Rb; if $\Sigma R_2O$ is >0, then the sum of MgO and ZnO is ≦10; and.
the ratio of MgO to $B_2O_3$ is 0.48-4.20.

In other preferred aspects, $\alpha_{20-300°C.} \leq 75 \times 10^{-7}/°$ C.; and/or index of refraction, $n_d$, is <1.530, preferably <1.510.

The effective linewidth $\Delta\lambda$ eff is generally about 27.0-30.5 nm. Although a narrow emission bandwidth increases the energy extraction efficiency, a large bandwidth will assist in increasing the incoherence of the pump beam, thus the efficiency of driving the target. In addition, a large emission bandwidth implies a large absorption bandwidth, i.e., increased coupling to the flashlamp output.

In additional preferred aspects, the sum content of $Al_2O_3$ and MgO is >9.1 mole %, the sum content of MgO and ZnO is 0-50.0 mole; the sum content of $Al_2O_3$, MgO, and ZnO is >14.3 mole % and <46.2 mole %; the sum content of $P_2O_5$, $Al_2O_3$, $B_2O_3$, MgO, and ZnO is ≧88 mole %; the sum content of $Al_2O_3$, $B_2O_3$, and MgO is >10.5 mole % and <46.2 mole %; the glass contains essentially no alkali; $\Sigma R_2O$ is 0.0 mole %; the sum content of $R^1O$ and $R^2{}_2O_3$ is >28.8 mole % and <46.2 mole %, $R^1$ being Ba, Mg, Ca, Sr, Pb and Zn and $R^2$ being Al, B, and Ln; the sum of $Al_2O_3$, $B_2O_3$, and $R^1O$ is <30.4, $R^1$ being Ba, Mg, Ca, Sr, Pb and Zn, if $P_2O_5$ is ≧60 and $\Sigma R_2O$ is 0.0; the ratio of MgO to $B_2O_3$ is 0.48-4.20; the sum content of $Al_2O_3$ and $B_2O_3$ is >9.1 mole % and <30.5 mole %; the sum content $Al_2O_3$, $B_2O_3$, and ZnO is >10.5 mole % and <41.2 mole %; and/or the $Al_2O_3$ content is 4-<20 mole %; the $B_2O_3$ content is 5-25 mole %; the ZnO content is 5-31 mole %; $\Sigma R^2{}_2O_3$ is 10-40 mole %; and/or the ratio of $P_2O_5$ to $Al_2O_3$ is 3.5-7.5.

BRIEF DESCRIPTION OF THE DRAWINGS

Various other objects, features and attendant advantages of the present invention will be more fully appreciated as the same becomes better understood when considered in conjunction with the following discussion and the accompanying drawings wherein:

FIG. 4 shows the functional dependence of cross section versus CaO content for varying amounts of MgO (total alkaline earth metal content held constant).

FIG. 1A was prepared by the program called ECHIP ®. This software estimates the resultant values (in this case, cross section), in wider ranges based on experimented space. The program does not have capability to predict devitrification region, which must be hand selected. FIG. 1A is a raw output (when alkali content is 2 mol%), which predicts cross section values (see legend to the right of FIG. 1A). Cross section values were input as, for example, $250 \times 10^{-18} cm^2$ rather than $2.5 \times 10^{-20} cm^2$ to increase analysis resolution. The region defined by actual data input is shown in FIG. 1B. The important region is the upper lined portion within this region, wherein cross section value is less than $250 \times 10^{-18} cm^2$ (FIG. 1C). FIG. 1D indicates the amount of each component at some border points.

Figure 1A:
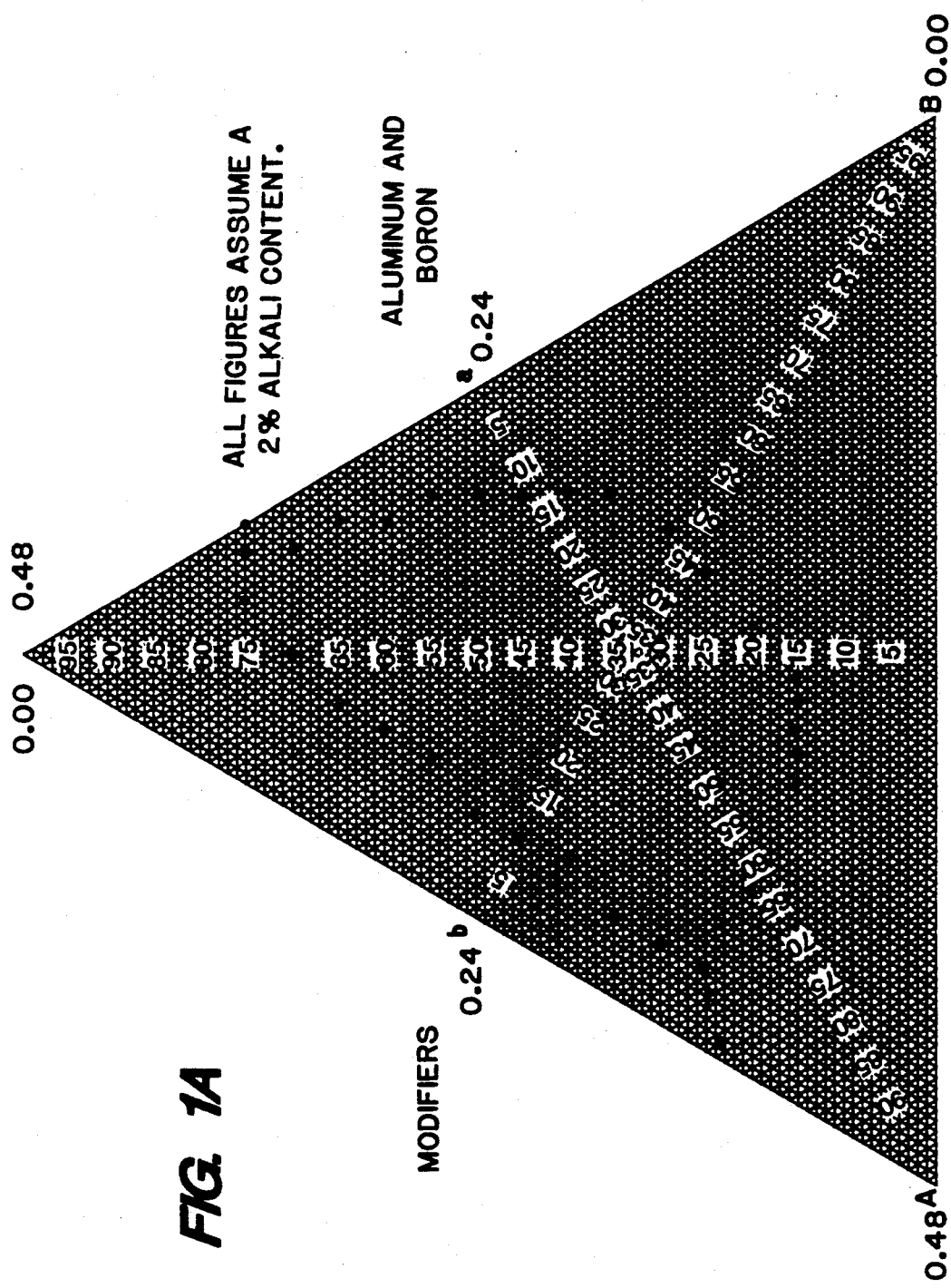
FIGS. 1A to 1D show a three-phase diagram of $P_2O_5$ versus $Al_2O_3 + B_2O_3$ versus MgO+ZnO.
Figure 1B:
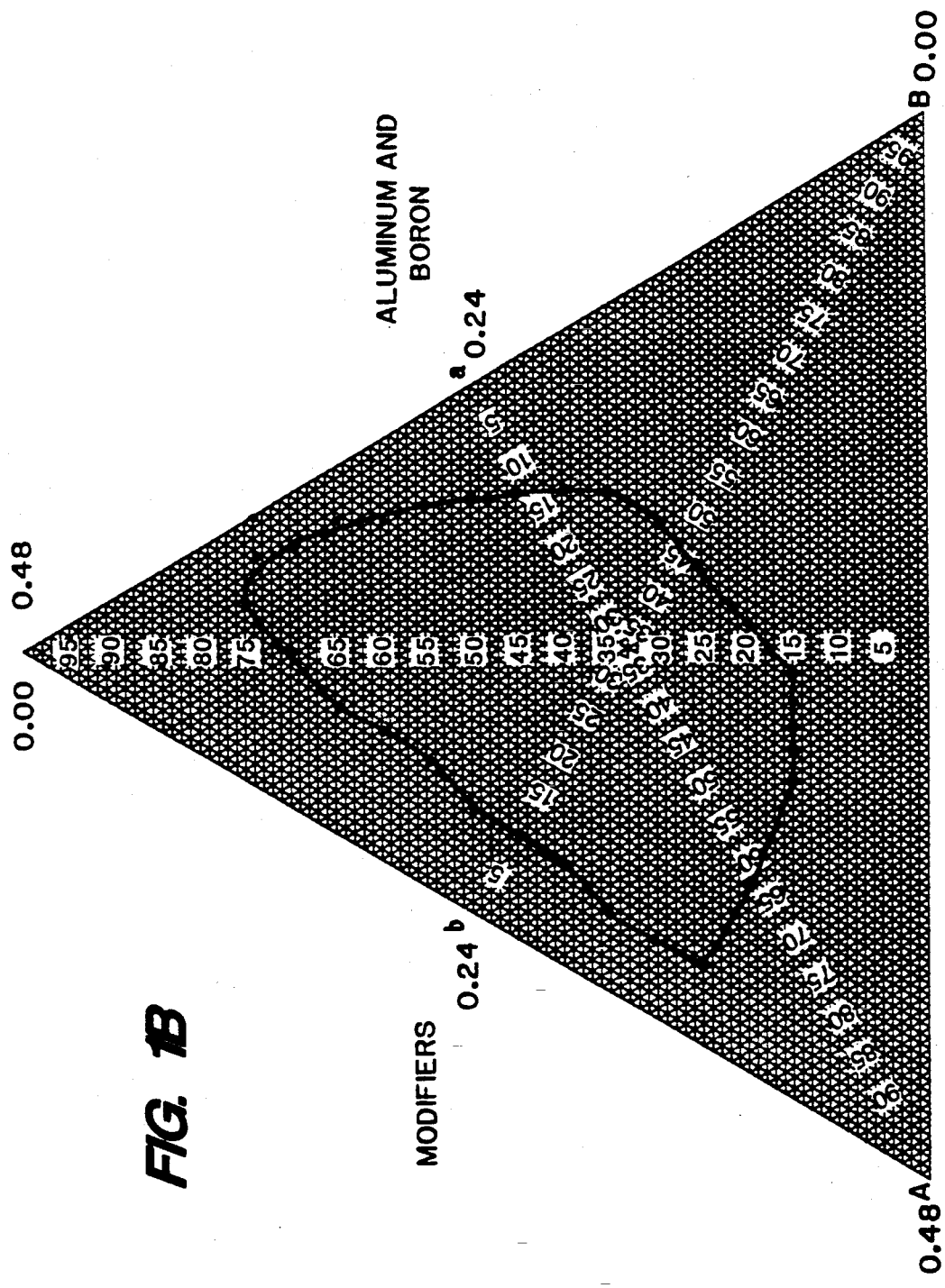

Special emphasis in this invention is placed on cross section and fluorescence lifetime. The properties of Young's modulus and Poisson's ratio are, in general, not strongly affected by the compositional variations within the scope of this invention. The compositions of the invention further are compatible with current melting technology, thus assuring that the glasses of this invention will be produced with excellent optical and inclusion qualities.

These glass compositions employing $P_2O_5$ as the principal glass former, in comparison to $SiO_2$, also advantageously provide laser glasses characterized by lower nonlinear refractive index, higher laser gain, and a negative or near zero value for the temperature dependence of refractive index. This latter property denotes to the glasses an overall value of temperature coefficient of optical path length near zero. The glasses thus can be described as essentially athermal.

Generally, the $P_2O_5$ content is 52-72 mole %. The $P_2O_5$ content can also be defined in terms of 53, 54, 55, 56, 57, 58, 59, 60, 61, 62, 63, 64, 65, 66, 67, 68, 69, 70, 71, etc.

A preferred application of the glasses of this invention is in high energy laser systems. They are especially useful as laser amplifiers in view of their uniquely beneficial combination of laser properties, especially the low cross section and high fluorescence lifetime.

The values for cross section and fluorescence lifetime described herein are measurement specific. That is the values for these proportions are specific to the manner in which they were measured and thus may not be comparable to values obtained when these properties are measured in other ways.

In a large-aperture amplifier, in which the size of amplified spontaneous emission (ASE) becomes significant, a major effect is reduction of the fluorescence lifetime, which decreases the efficiency of pumping. Such a large ASE effect is accompanied with high cross section; therefore, it is necessary to have low cross section glass for this application in order to maintain high efficiency. Also, excited ions with high cross sections will give up their energy more rapidly than those with low cross sections. For increased stored energy, again, low cross section is more beneficial.

Fluorescence decay lifetime ($\tau$) is measured by the following method: A glass sample is pumped by a fast (less than 5 microseconds), high power flashlamp. The lamp spectrum is attenuated with appropriate filters so that only the ultraviolet through the visible region of the spectrum is transmitted to the sample.

The fluorescence of the sample is collected by an S-1 response photomultiplier tube, which is protected by a filter which blocks the ultraviolet through visible range of the spectrum. The signal is then amplified, passed through an A/D converter, and transmitted to a computer where the fluorescence decay curve is analyzed, and the first e-folding time is calculated. The first e-folding time is referred to as the fluorescence decay lifetime.

Fluorescence lifetime measurements of the samples listed in Table 1 were initially begun by Schott Glass Technologies, Inc. (SGT) but were interrupted due to equipment difficulties. Thus, the fluorescence lifetime measurements were completed by Lawrence Livermore National Laboratory (LLNL). LLNL measured the fluorescence lifetimes of samples 31 to 55 and 57 to 60. SGT measured the fluorescence lifetimes of all other samples.

However, two different methods of measurements were employed which lead to differing results. The major reason for the different results was sample size. LLNL used a very small sample ($3 \times 3 \times 2$ mm) to avoid artificial fluorescence trapping within the sample. The samples utilized by SGT were fairly large ($50 \times 50 \times 5$ mm).

A correlation of the values was obtained by taking lifetime measurements for six samples by both methods. The results were as follows:

| Sample | LLNL Value | SGT Value |
|--------|------------|-----------|
| 31 | 300 | 352 |
| 32 | 312 | 345 |
| 33 | 320 | 352 |
| 34 | 320 | 374 |
| 37 | 312 | 349 |
| 38 | 304 | 361 |

The average discrepancy is 44. Thus, the lifetime values reported in Table 1 for samples 31-55 and 57-60 can be obtained by adding 44 to the following values measured by LLNL:

| Sample | Lifetime |
|--------|----------|
| 35 | 320 |
| 36 | 320 |
| 39 | 320 |
| 40 | 304 |
| 41 | 328 |
| 42 | 320 |
| 43 | 304 |
| 44 | 288 |
| 45 | 312 |
| 46 | 304 |
| 47 | 320 |
| 48 | 288 |
| 49 | 312 |
| 50 | 296 |
| 51 | 328 |
| 52 | 328 |
| 53 | 312 |
| 54 | 328 |
| 55 | 328 |

-continued

| Sample | Lifetime |
| --- | --- |
| 57 | 352 |
| 58 | 320 |
| 59 | 344 |
| 60 | 304 |

The calculation of the stimulated emission cross section is done by using the Deutchbein technique (IEEE J. Quantum Mech., September 1976, pp. 551-554). The individual measurements necessary to do this calculation include: $Nd^{3+}$ concentration, fluorescence intensity, fluorescence spectral area, absorption spectral area, and the peak wavelength of absorption spectrum.

Nd ion concentration is measured by using X-ray fluorescence spectrometry (XRF) for this series o glasses. The sample is compared to a standard of known $Nd_2O_3$ content by weight percent. A previous method involved the use of spectrophotometers and a standard correction curve that was sensitive to the host glass composition.

The XRF method is also more sensitive to the surface condition and optical homogeneity of the glass. However, application of the XRF method allows the theoretical matrix corrections, which are adequate for compositional study, where glass compositions change significantly and a calibration curve for each glass composition cannot be obtained easily. The XRF method was justified by comparing results of Nd content obtained at LLNL by ICP, Inductively Coupled Plasma, which is a method of atomic excitation before measurement by atomic absorption. LLNL eliminated host glass dependency of the Nd signal by fusing glass with a much larger amount of lithium metaborate prior to measuring signals. The following glasses were measured by both methods and their agreement is more than satisfactory.

| | Nd Wt. % | |
| --- | --- | --- |
| Sample | SGT (XRF) | LLNL (ICP) |
| 40 | 4.18 | 4.12 |
| 41 | 3.19 | 3.23 |
| 17 | 3.14 | 3.17 |
| 25 | 2.95 | 2.77 |
| 57 | 2.06 | 2.01 |
| 46 | 3.01 | 3.00 |

Fluorescence intensity and fluorescence area are measured by use of a fluorimeter with an S-1 response photomultiplier tube as the detector. This unit is coupled to a data station which calculates the appropriate values. The absorption area is similarly obtained on a spectrophotometer, while maximum wavelength of absorption is read from the transmission curve.

Herein, the fluorescence lifetime of >325 μsecs refers to the lifetime measured when Nd is present as the lasing species. Typical lifetimes for several other lasing ions in glass is as follows:

| Lasing ions | Host glass | Lifetime |
| --- | --- | --- |
| $Yb^{3+}$ | silica | 880 microseconds |
| $Tm^{3+}$ | silica | 200 |
| $Tm^{3+} + Yb^{3+}$ | silica | 150-1500 |
| $Er^{3+} + Yb^{3+}$ | phosphate | 6-8 ms |

To suppress cross section, the glass composition should have a low alkali content. Preferably, no alkali metals are added. Thus, the total alkali content should be less than 5 mole % and preferably is 0.0 mole %. The $Na_2O$ content can, therefore, be described in terms of 0, 1, 2, 3, 4, etc., moles%. Similarly, the individual contents of $Li_2O$, $K_2O$, $Cs_2O$, and $Rb_2O$ can each be defined in terms of 0, 1, 2, 3, etc., mole %.

Figure 2:
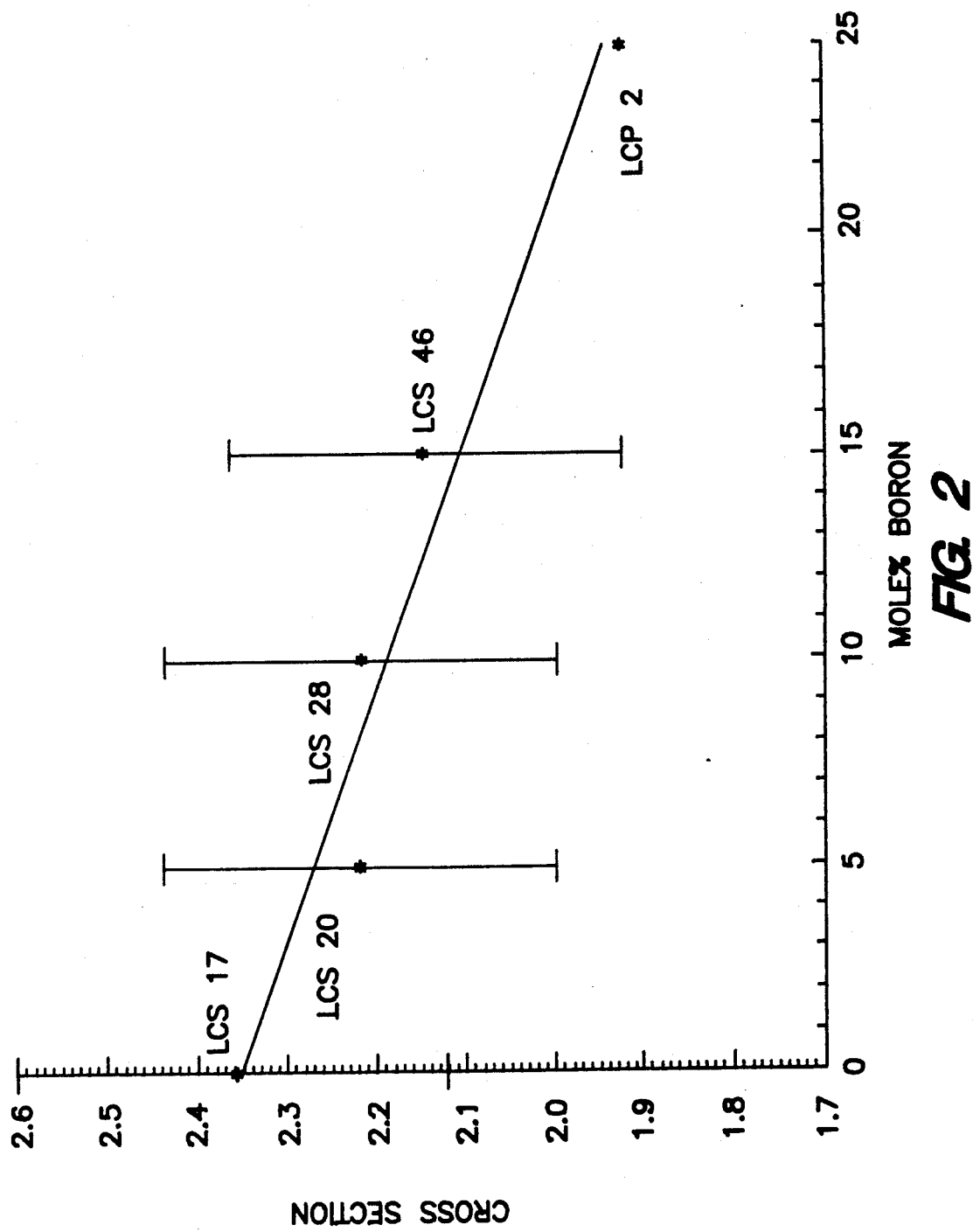
FIG. 2 shows the functional dependence of cross section versus $B_2O_3$ content for varying amounts of MgO (individual amounts of $P_2O_5$ and $Al_2O_3$ held constant and total of $B_2O_3$ and MgO held constant)

In FIG. 2, the total individual amounts of $P_2O_5$ and $Al_2O_3$ are each held constant while $B_2O_3$ is increased by a decrease of MgO (i.e., total of $B_2O_3$ and MgO stays constant). In this manner, the increase in $B_2O_3$ with matching decrease in MgO causes the $MgO:R_2O_2$ ratio to be lowered, and the result is a decrease in cross section.

Figure 3:
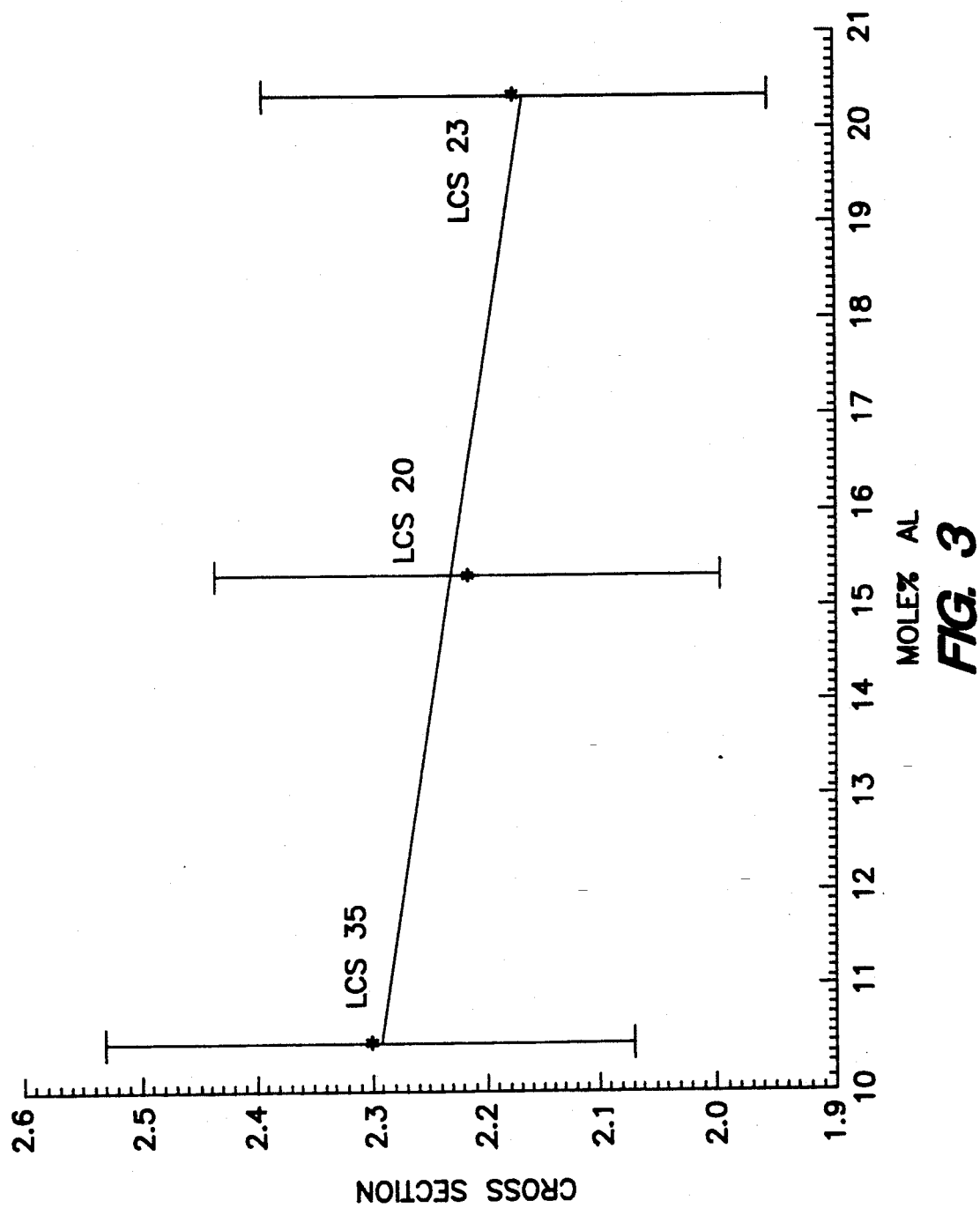
FIG. 3 shows the functional dependence of cross section versus Al:B ratio (MgO:$R_2O_3$ ratio held constant)

In FIG. 3, the $MgO:R_2O_3$ ratio is held constant while altering the Al:B ratio. The graph shows that as Al increases and B concomitantly decreases, the cross section decreases slightly. Thus, Al may be the more desirable species. However, since Al tends to initiate crystallization at approximately 20 mole percent, at high Al contents B can be alternatively used to further lower the $MgO:R_2O_3$ ratio.

$Al_2O_3$ is a particularly important component. It imparts to the resultant glass better chemical durability. Levels of $Al_2O_3$ of approximately 20 mole % and higher tend to have the undesirable effect of crystallization. Thus, the $Al_2O_3$ content is generally 0 to less than 20 mole %, preferably 4 to less than 20 mole Other limits of $Al_2O_3$ contents are, e.g., 1, 2, 3, 5, 6, 7, 8, 9, 10, 11, 12, 13, 14, 15, 16, 17, 18, and 19 mole %.

Boron has no significant effect on either refractive index or on the thermal expansion coefficient. But high boron content does exhibit the adverse side effect of raising the transformation temperature ($T_g$). This temperature can be used as an indicator of the "meltability" of the glass.

$B_2O_3$ content is generally 0-25 mole %, preferably 5-25 mole %. Other limits for $B_2O_3$ content are, e.g., 1, 2, 3, 4, 6, 7, 8, 9, 10, 11, 12, 13, 14, 15, 16, 17, 18, 19, 20, 21, 22, 23, and 24 mole %.

Zinc can be used to replace small quantities of alkalis without increasing the cross section of the glass. It can also be used to compensate for the increased melting temperature associated with Boron. For example, comparing LCS-40 to LCS-44 glass compositions (see Table 1), a 16 mole % shift from B to Zn results in a 150° C. drop in transformation temperature.

Shifting from B to Zn does not result in any appreciable adverse side effects with respect to either refractive index or thermal expansion coefficient. However, the shift does tend to raise the cross section of the glass in quantities above 10 mole %.

The ZnO content is generally 0-31 moles, preferably 5-31 mole %. The limits of ZnO content can also be defined as 1, 2, 3, 4, 6, 7, 8, 9, 10, 11, 12, 13, 14, 15, 16, 17, 18, 19, 20, 21, 22, 23, 24, 25, 26, 27, 28, 29, 30 mole %, etc.

Although CaO, SrO, BaO and/or MgO are not required per this invention to produce a glass suitable as a high average power laser material, it is nevertheless desirable to add these oxides to improve the properties of the compositions while still retaining those properties desirable in a high average power laser material. For example, the addition of small amounts of alkaline earth metal oxides improves the chemical durability and imparts to the glass a higher stability against crystallization during manufacturing. Minimum contents for these alkaline earth compounds, as well as those for the other optional components of the glasses of this invention are, e.g., 1, 2, 3, 4, 5 mole %, etc.

Of the alkaline earth metals, magnesium is the most favored. As the atomic number within the alkaline earths increases, there also is an increase in cross section (compare LCS-37 and LCS-48). Also, heavier alkaline earths tend to increase the refractive index as well as increase the thermal expansion coefficient. A schematic demonstration of this is shown in FIG. 4, wherein the total alkaline earth content is held constant while calcium is shifted to magnesium.

Generally, the MgO content range can be defined in terms of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, etc., mole %. Similarly, the individual BaO, CaO, and SrO contents can be each defined in terms of 0, 1, 2, 3, 4, 5, 6, 7, 8, 9, 10, 11, 12, 13, 14, 15, 16, 17, 18, 19, etc. mole %.

Addition of PbO is not required, and its content is preferably <5 mole %. Other limits for PbO content are 0, 1, 2, 3, 4 mole %.

The addition of $SiO_2$, while not required, can raise the thermal conductivity of the resultant glass without strongly influencing thermal expansion. However, the addition of $SiO_2$ makes the glass more prone to crystallization and decreases fluorescence lifetime. Furthermore, the presence of silica in a glass melt is known to lower the solubility of ionic platinum in such melts, leading to incorporation of platinum particles from state-of-the-art melters into the resultant glass. These particles (inclusions) absorb laser radiation and can become damage sites within the element, potentially rendering the material useless as a high quality optical element. Thus, the ability of this invention to achieve its excellent thermal, mechanical and optical properties without necessary $SiO_2$ contents is a major advantage.

$Nd_2O_3$, the preferred lasing species, is added to the glasses in sufficient quantity to achieve the desired lasing activity as is true for the other lasing species and systems. At too high levels of $Nd_2O_3$ concentration and other lasing species concentration, quenching of the fluorescence emission can occur, and there is a corresponding drop in fluorescence lifetime of the excited state involved in the laser transition. Suitable upper limits in a given case can be routinely determined.

Any conventional glass lasing species can be used, e.g., Nd, Tm, Yb, Dy, Pm, Tb, Er, Ho, Ti, V, Cr, Eu, Sm, etc. In another embodiment of the present invention, the laser compositions can contain suitable co-dopants along with primary lasing ions. These include transition metals like chromium and vanadium, or lanthanide ions, such as thulium and erbium. These have broad and intense absorption bands and resultant co-dopant fluorescence bands which overlap with the primary lasing ion absorption levels. See, e.g., *Physics of Laser Fusion*, Volume IV, "The Future Development of High-Power Solid State Laser Systems." This phenomenon leads to a more efficient conversion of pump radiation into the excited state population of lasing ions.

The total amount of these active ions alone or in combination is 0.01-6 mole % typically. However, as noted above, higher amounts can be used where appropriate, e.g., 7, 8, 9, 10, 11, 12, 13, 14, 15, 17, 25 mole %, etc. See Emmett et al., Lawrence Livermore National Laboratory, UCRL-53344, November 1982.

Addition of $La_2O_3$ allows direct substitution of $Nd_2O_3$ or other lasing or energy transfer lanthanide species by another lanthanide oxide, which is nearly an exact structural replacement in the case of $Nd_2O_3$. This allows the manufactured glass to be produced with a broad range of neodymium or other lasing species doping levels while minimizing the change from this adjustment on the physical, thermal, and optical properties of the produced glasses. Thus, $La_2O_3$ amounts typically are 0.01-6 mole %, but higher contents are possible, e.g., up to 10% or even up to 20% as a replacement for lanthanide lasing species.

Glass compositions according to the invention which do not contain lasing species are good candidates for high energy laser optics since they can be manufactured Pt-free and yet have good thermomechanical properties comparable to silicate glasses.

It is further possible to add small amounts, e.g., 0–<1 mole %, preferably 0.1–0.3 wt. %, of conventional refining agents such as $As_2O_3$ and $Sb_2O_3$ to the compositions to aid in manufacturing while not compromising high average power properties. It is additionally possible to add small antisolarization effective amounts, e.g., 0–<1 mole %, preferably 0.1–1.5 wt. %, of conventional antisolarants such as $TiO_2$, $CeO_2$ and $Nb_2O_5$ (as well as others, e.g., $SiO_2$ and $Sb_2O_3$) to suppress solarization of these glasses during exposure to intense UV radiation, common during application as an active laser material. It is further possible to omit a lasing species entirely in the glasses, e.g., for their use in other applications, e.g., in optical elements such as lenses, mirrors, etc., where their exceptional properties are beneficial.

A further advantage of the glasses of this invention is their compatibility with current state-of-the-art manufacturing methods for phosphate laser glasses. The melting, refining, homogenizing and casting of these glasses can be accomplished using the current standard procedures employed by the glass industry. The highly thermal stress resistant glasses of this invention can be formed into slabs, rods, discs, and other shapes required by the laser community and others by conventional forming techniques well known in the glass industry. The resultant glasses are of desirable cross section, good fluorescence lifetime for excited state emission, high thermal conductivity, low thermal expansion, and high optical quality and optical homogeneity even in large sizes of as much as 15 to 20 liters of produced glass, and are free of all inclusions which can absorb or scatter laser radiation. Optical elements of these glasses can thus be fabricated utilizing standard procedures for cutting, grinding and polishing optical glass.

The glasses of this invention can be fully conventionally prepared by mixing the appropriate amounts of each constituent in a batch which is then charged into a fused silica crucible and melted by induction heating from, e.g., 1100° C. to as much as 1500° C. depending on the chosen composition. The glass can then be refined at temperatures exceeding, e.g., 1300° C. from typically 2 to 4 hours, again depending on composition and thus melt viscosity, with equal intervals of gas bubbling and stirring. The glass typically is then cast into steel molds and annealed at the transformation temperature plus about 20° C. for about 2 hours, followed by cooling at about 30° C./hour. These procedures were followed in the examples below.

As noted above, the examples of this application are melted in a fused silica crucible. Under such melting conditions, as is well known, there will be some silica added from the crucible to the final glass composition. Accordingly, whereas all compositions given in this disclosure refer to component contents as added to the batch as is conventional (batch compositions), where a fused silica crucible is employed, the final composition will contain some silica. This conventional difference from the initial batch composition is analogous to other differences between final glass compositions and batch compositions, e.g., due to volatilization of ingredients, etc. For this invention, the additional amount of silica over and above the amount included in the batch composition will typically be no more than about 3.5, 3, 2.5, 2, 1.5, 1, 0.5 mole %, etc., especially not more than about 3 mole %, and most especially not more than about 2 mole % (all on a renormalized basis).

In a preferred aspect of this invention, there is no silica added to the batch composition and the final composition contains no more than 3 mole % silica, especially not more than 2 or 1 mole % silica (on the mentioned basis) due to the effect of silica melting from the crucible. Of course, where a nonsilica-containing crucible is employed, this effect will not occur. The silica contribution from the crucible will vary conventionally with melt temperature and melting time. For example, for a melt time of about 2 hours at a temperature of about 1300° C., about 2 wt. % of silica will be contributed from a quartz crucible, the precise amount being determined by the precise conditions involved, such as glass volume exposed, crucible surface area, glass composition, degree of agitation of the melt, etc.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius and, unless otherwise indicated, all parts and percentages are by weight.

The entire texts of all applications, patents and publications cited above are hereby incorporated by reference.

EXAMPLES

It will be noted that several of the examples achieve properties falling outside the scope of this invention. These examples thus demonstrate the importance of certain factors discussed above in achieving the properties of this invention and, most importantly, provide valuable guidance as to how routine experimentation may be utilized to select compositions within the general composition space defined for this invention which have the properties defined for this invention. Fully conventional consideration will, of course, be given by skilled workers in any study of these examples to the experimental errors involved in measuring the disclosed properties, e.g., ±4% for $K_{90°\,C}$ and ±1% for $a$.

For the properties listed in Table 1, the following units are employed:

| | |
|---|---|
| Nonlinear refractive index: | $10^{-13}$ esu |
| CTE: | $10^{-7}$/°C. |
| Lifetime: | microseconds |
| Absorption: | $cm^{-1}$ |
| Transformation temperature: | °C. |
| Emission cross section: | $10^{-20}\,cm^2$ |
| Effective linewidth: | nm |

TABLE 1

| Mole % | 1 | 2 | 3 | 4 | 5 | 6 | 7 | 8 |
|---|---|---|---|---|---|---|---|---|
| $P_2O_5$ | 65 | 65 | 65 | NOT MELTED | 67.96 | 68.0 | 52.6 | 52.6 |
| $Al_2O_3$ | 10 | 10 | 15 | | 9.11 | 9.1 | 15.4 | 15.4 |
| $B_2O_3$ | | | | | 11.33 | 11.1 | | |
| $As_2O_3$ | 0.1 | 0.1 | 0.1 | | | 0.1 | 0.1 | 0.1 |
| $Nb_2O_5$ | | | | | | | | |
| $Li_2O$ | 8.0 | 3.0 | 3.0 | | | • | 5.0 | |
| $Na_2O$ | | | | | | | | 5.0 |
| $K_2O$ | | 5.0 | | | 1.91 | 3.0 | | 5.0 |
| $Cs_2O$ | | | | | | | | |
| MgO | 15.4 | 15.4 | 15.4 | | 5.27 | 4.2 | 25.7 | 25.7 |
| CaO | | | | | | | | |
| BaO | | | | | | | | |
| ZnO | | | | | | | | |
| $Ln_2O_3$ | 1.5 | 1.5 | 1.5 | | 4.42 | 4.5 | 1.5 | 1.5 |
| Others | | | | | | | | |
| Non-linear index $n_2$ | 1.081 | 1.057 | 1.271 | | 1.197 | 1.129 | CRYSTAL-LIZED | 1.006 |
| Index $n_d$ | 1.5248 | 1.5215 | 1.5129 | | 1.5310 | 1.53349 | | 1.4982 |
| CTE (20-300) | 66.9 | 77.7 | 61.5 | | 68.1 | 68.3 | | 65.9 |
| Lifetime t | 354 | 360 | 355 | | 365 | 352 | | 330 |
| Absorption @ 3000 nm | 0.54 | 0.636 | 0.772 | | 0.489 | 0.560 | | 0.257 |
| Transformation Temp., Tg | 515 | 535 | 549 | | 651 | 641 | | 533 |
| Wt. % $Nd_2O_3$ | 3.22 | 3.19 | 3.19 | | 3.29 | 3.40 | | 3.03 |
| Cross Section | 3.07 | 3.12 | 2.69 | | 2.61 | 2.69 | | 2.49 |
| Effective Linewidth | 27.50 | 27.12 | 28.29 | | 28.71 | 28.38 | | 28.90 |

| Mole % | 9 | 10 | 11 | 12 | 13 | 14 | 15 | 16 |
|---|---|---|---|---|---|---|---|---|
| $P_2O_5$ | 57.6 | 65 | 56.5 | 65.0 | 62.1 | 55.0 | 67.0 | 67.0 |
| $Al_2O_3$ | 15.4 | 15 | 16.5 | 15.0 | 27.6 | 20.0 | 18.4 | 18.4 |
| $B_2O_3$ | | | | | | | | |
| $As_2O_3$ | 0.1 | 0.1 | 0.1 | 0.1 | 0.1 | 0.1 | 0.1 | 0.1 |

TABLE 1-continued

| Mole % | | | | | | | | |
|---|---|---|---|---|---|---|---|---|
| $Nb_2O_5$ | | | | | | | | |
| $Li_2O$ | | | | | | | | |
| $Na_2O$ | | | | | | | | |
| $K_2O$ | 5.0 | 3.0 | 3.5 | 3.0 | | 10.0 | 3.0 | 3.0 |
| $Cs_2O$ | | | | | | | | |
| MgO | 20.7 | 15.4 | 22.0 | 10.0 | | 10.0 | 10.0 | 5.0 |
| CaO | | | | | | | | |
| BaO | | | | 5.4 | | | | |
| ZnO | | | | | | 3.0 | | |
| $Ln_2O_3$ | 1.5 | 1.5 | 1.5 | 1.5 | 10.3 | 1.9 | 1.5 | 6.5 |
| Others | | | | | NO GLASS | | | |
| Non-linear index $n_2$ | 1.020 | 1.042 | CRYSTALLIZED | 1.083 | FORMED | CRYSTALLIZED | 1.046 | 1.151 |
| Index $n_d$ | 1.50606 | 1.51598 | | 1.52517 | | | 1.51740 | 1.52689 |
| CTE (20-300) | 69.6 | 67.6 | | 72.7 | | | 64.1 | 59.34 |
| Lifetime t | 354 | 373 | | 344 | | | 362 | 329 |
| Absorption @ 3000 nm | 0.360 | 0.314 | | 0.72 | | | 0.47 | 0.58 |
| Transformation Temp., Tg | 558 | 607 | | 587 | | | 624 | 589 |
| Wt. % $Nd_2O_3$ | 3.07 | 3.23 | | 3.23 | | | 3.21 | 3.15 |
| Cross Section | 2.60 | 2.77 | | 2.84 | | | 2.76 | 2.44 |
| Effective Linewidth | 28.31 | 27.96 | | 27.94 | | | 28.03 | 29.60 |

| Mole % | 17 | 18 | 19 | 20 | 21 | 22 | 23 | 24 |
|---|---|---|---|---|---|---|---|---|
| $P_2O_5$ | 57.6 | 57.6 | 65.0 | 57.6 | 65.0 | 60.0 | 57.6 | 72.0 |
| $Al_2O_3$ | 15.4 | 15.4 | 18.0 | 15.4 | 15.0 | 15.0 | 20.4 | 15.0 |
| $B_2O_3$ | | | | 5.0 | | | | |
| $As_2O_3$ | 0.1 | 0.1 | 0.1 | 0.1 | 0.1 | 0.1 | 0.1 | 0.1 |
| $Nb_2O_5$ | | | | | | | | |
| $Li_2O$ | | | | | | | | |
| $Na_2O$ | | | 15.4 | | | 3.0 | | |
| $K_2O$ | | | | | 3.0 | | | 1.0 |
| $Cs_2O$ | | | | | | | | |
| MgO | 25.7 | 20.7 | | 20.7 | 11.9 | 20.0 | 20.7 | 10.4 |
| CaO | | | | | | | | |
| BaO | | | | | | | | |
| ZnO | | 5.0 | | | | | | |
| $Ln_2O_3$ | 1.5 | 1.5 | 1.5 | 1.5 | 5.0 | 1.5 | 1.5 | 1.5 |
| Others | | | | | | | | |
| Non-linear index $n_2$ | 0.994 | 1.023 | 1.063 | 1.058 | 1.085 | 1.033 | 0.978 | 1.043 |
| Index $n_d$ | 1.49348 | 1.50066 | 1.52372 | 1.49963 | 1.52363 | 1.50831 | 1.48933 | 1.50923 |
| CTE (20-300) | 52.8 | 54.3 | 88.0 | 54.8 | 66.1 | 65.7 | 77.0 | 60.4 |
| Lifetime t | 347 | 352 | 337 | 351 | 345 | 359 | 346 | 325 |
| Absorption @ 3000 nm | 0.46 | 0.581 | 1.35 | 0.704 | 0.35 | 0.50 | 0.461 | 0.361 |
| Transformation Temp., Tg | 582 | 574 | 544 | 613 | 587 | 558 | 584 | 617 |
| Wt. % $Nd_2O_3$ | 3.14 | 3.05 | 3.07 | 3.01 | 3.13 | 3.08 | 3.01 | 3.97 |
| Cross Section | 2.36 | 2.29 | 3.19 | 2.22 | 2.57 | 2.59 | 2.18 | 2.53 |
| Effective Linewidth | 28.81 | 29.33 | 27.33 | 27.32 | 28.52 | 28.53 | 29.68 | 28.74 |

| Mole % | 25 | 26 | 27 | 28 | 29 | 30 | 31 | 32 |
|---|---|---|---|---|---|---|---|---|
| $P_2O_5$ | 57.6 | 60.0 | 60.0 | 57.6 | 57.6 | 65.0 | 65.0 | 67.0 |
| $Al_2O_3$ | 15.5 | 15.0 | 20.0 | 15.5 | 15.5 | 15.0 | 15.0 | 18.8 |
| $B_2O_3$ | 5.0 | | | 10.0 | 5.0 | | 15.8 | 10.0 |
| $As_2O_3$ | 0.1 | 0.1 | 0.1 | 0.1 | 0.1 | 0.1 | 0.1 | 0.1 |
| $Nb_2O_5$ | 0.2 | | | 0.2 | 0.2 | | | |
| $Li_2O$ | | | | | | | | |
| $Na_2O$ | | | | | | | | |
| $K_2O$ | | | 3.0 | | | | | |
| $Cs_2O$ | | | | | | 3.0 | 3.0 | 3.0 |
| MgO | 10.7 | | 15.4 | 15.7 | 15.7 | 15.8 | | |
| CaO | 10.0 | 18.4 | | | | | | |
| BaO | | | | | | | | |
| ZnO | | | | | 5.0 | | | |
| $Ln_2O_3$ | 1.2 | 1.5 | 1.5 | 1.2 | 1.2 | 1.2 | 1.2 | 1.2 |
| Others | | PbO 5.0 | | | | | | |
| Non-linear | 1.047 | 1.328 | CRYSTALLIZED | 1.017 | 1.043 | 1.027 | 1.026 | 1.042 |

TABLE 1-continued

| | | | | | | | | |
|---|---|---|---|---|---|---|---|---|
| index $n_2$ | | | | | | | | |
| Index $n_d$ | 1.51186 | 1.54455 | | 1.50601 | 1.50568 | 1.51103 | 1.52484 | 1.52451 |
| CTE (20-300) | 61.06 | 71.80 | | 56.6 | 56.7 | 64.0 | 61.8 | 61.6 |
| Lifetime t | 352 | 337 | | 364 | 361 | 357 | 352 | 345 |
| Absorption @ 3000 nm | 0.674 | 0.668 | | 0.693 | 0.951 | 0.397 | 0.673 | 0.520 |
| Transformation Temp., Tg | 613 | 561 | | 646 | 603 | 615 | 728 | 718 |
| Wt. % $Nd_2O_3$ | 2.95 | 3.05 | | 2.98 | 3.02 | 3.79 | 3.78 | 3.61 |
| Cross Section | 2.29 | 2.70 | | 2.22 | 2.24 | 2.36 | 2.22 | 2.39 |
| Effective Linewidth | 29.56 | 28.46 | | 29.72 | 29.37 | 28.38 | 29.52 | 28.81 |

| Mole % | 33 | 34 | 35 | 36 | 37 | 38 | 39 | 40 |
|---|---|---|---|---|---|---|---|---|
| $P_2O_5$ | 57.6 | 62.6 | 57.5 | 57.5 | 68.0 | 65.0 | 68.0 | 68.0 |
| $Al_2O_3$ | 15.5 | 15.5 | 10.5 | 15.5 | 9.1 | 15.0 | 14.1 | 4.1 |
| $B_2O_3$ | 5.0 | 5.0 | 10.0 | 5.0 | 11.1 | | 6.0 | 16.1 |
| $As_2O_3$ | 0.1 | 0.1 | 0.1 | 0.1 | 0.1 | 0.1 | 0.1 | 0.1 |
| $Nb_2O_5$ | 0.2 | 0.2 | 0.2 | 0.2 | | | | |
| $Li_2O$ | 5.0 | | | | | | | |
| $Na_2O$ | | | | | | | | |
| $K_2O$ | | | | | | 3.0 | | |
| $Cs_2O$ | | | | | | | | |
| MgO | 15.7 | 15.7 | 20.7 | 20.7 | 10.2 | | 10.2 | 10.2 |
| CaO | | | | | | | | |
| BaO | | | | | | | | |
| ZnO | | | | | | 15.7 | | |
| $Ln_2O_3$ | 1.2 | 1.2 | 1.0 | 1.0 | 1.5 | 1.2 | 1.5 | 1.5 |
| Others | | | | | | | | |
| Non-linear index $n_2$ | 1.052 | 1.031 | 1.040 | 1.046 | 1.028 | 1.119 | 1.100 | 1.032 |
| Index $n_d$ | 1.50363 | 1.50828 | 1.50736 | 1.51426 | 1.51853 | 1.52670 | 1.51511 | 1.52228 |
| CTE (20-300) | 63.6 | 58.1 | 63.2 | 59.2 | 63.6 | 64.1 | 59.8 | 65.6 |
| Lifetime t | 352 | 374 | — | — | 349 | 361 | — | — |
| Absorption @ 3000 nm | 0.57 | 0.433 | 0.678 | 0.601 | 0.61 | 0.600 | 0.511 | 1.056 |
| Transformation Temp., Tg | 532 | 642 | 641 | 670 | 686 | 572 | 664 | 714 |
| Wt. % $Nd_2O_3$ | 3.00 | 3.14 | 3.05 | 3.14 | 3.74 | 3.38 | 3.45 | 4.18 |
| Cross Section | 2.60 | 2.41 | 2.30 | 2.40 | 2.48 | 2.78 | 2.50 | 2.38 |
| Effective Linewidth | 28.60 | 29.06 | 29.44 | 28.79 | 29.07 | 27.72 | 28.85 | 29.34 |

| Mole % | 41 | 42 | 43 | 44 | 45 | 46 | 47 | 48 |
|---|---|---|---|---|---|---|---|---|
| $P_2O_5$ | 63.0 | 63.0 | 68.0 | 68.0 | 68.4 | 57.5 | 57.5 | 68.0 |
| $Al_2O_3$ | 14.1 | 9.1 | 9.1 | 4.1 | 15.0 | 15.0 | 15.5 | 9.1 |
| $B_2O_3$ | 11.1 | 16.1 | | | | 15.0 | 10.0 | 11.1 |
| $As_2O_3$ | 0.1 | | 0.1 | 0.1 | 0.1 | 0.1 | 0.1 | 0.1 |
| $Nb_2O_5$ | | | | | | 0.2 | 0.2 | |
| $Li_2O$ | | | | | | | | |
| $Na_2O$ | | | | | | | | |
| $K_2O$ | | | | | | | | |
| $Cs_2O$ | | | | | 3.0 | | | |
| MgO | 10.2 | 10.2 | 10.2 | 10.2 | 12.0 | 10.7 | 5.7 | |
| CaO | | | | | | | | |
| BaO | | | | | | | | 10.2 |
| ZnO | | | 11.1 | 16.1 | | | 10.0 | |
| $Ln_2O_3$ | 1.5 | 1.5 | 1.5 | 1.5 | 1.5 | 1.04 | 1.06 | 1.5 |
| Others | | | | | | | | |
| Non-linear index $n_2$ | 1.025 | 1.017 | 1.112 | 1.140 | 1.049 | 1.037 | 1.071 | 1.130 |
| Index $n_d$ | 1.51460 | 1.51899 | 1.51627 | 1.52063 | 1.51640 | 1.51030 | 1.51372 | 1.54108 |
| CTE (20-300) | 61.8 | 68.2 | 63.1 | 67.3 | 69.7 | 56.4 | 55.7 | 75.1 |
| Lifetime t | — | — | — | — | — | — | — | — |
| Absorption @ 3000 nm | 0.840 | 0.750 | 0.348 | 0.410 | 0.685 | 0.865 | 0.667 | 0.726 |
| Transformation Temp., Tg | 682 | 708 | 577 | 543 | 612 | 688 | 633 | 635 |
| Wt. % $Nd_2O_3$ | 3.19 | 3.39 | 3.99 | 4.24 | 3.46 | 2.97 | 3.08 | 3.51 |
| Cross Section | 2.34 | 2.31 | 2.49 | 2.58 | 2.78 | 2.15 | 2.16 | 2.82 |
| Effective | 29.39 | 29.46 | 28.66 | 28.33 | 28.19 | 30.01 | 29.58 | 28.54 |

TABLE 1-continued

| Linewidth Mole % | 49 | 50 | 51 | 52 | 53 | 54 | 55 | 56 |
|---|---|---|---|---|---|---|---|---|
| $P_2O_5$ | 68.4 | 68.0 | 60.5 | 68.0 | 68.5 | 60.5 | 57.5 | 52.5 |
| $Al_2O_3$ | 13.0 | 9.1 | 15.5 | 14.1 | 11.5 | 17.5 | 15.5 | 15.5 |
| $B_2O_3$ | | 11.1 | 10.0 | 11.1 | | 5.0 | 20.7 | |
| $As_2O_3$ | 0.1 | 0.1 | 0.1 | 0.1 | 0.1 | 0.1 | 0.1 | 0.1 |
| $Nb_2O_5$ | | | 0.2 | | | 0.2 | 0.2 | 0.2 |
| $Li_2O$ | | | | | | | | |
| $Na_2O$ | | | 2.7 | | | | | |
| $K_2O$ | 5.0 | | | | 3.0 | | | |
| $Cs_2O$ | | | | | | | | |
| MgO | 12.0 | | | 5.2 | 15.4 | 10.7 | | 30.7 |
| CaO | | | | | | | | |
| BaO | | | | | | | | |
| ZnO | | 10.2 | 10.0 | | | 5.0 | 5.0 | |
| $Ln_2O_3$ | 1.5 | 1.5 | 1.1 | 1.2 | 1.5 | 1.07 | 1.08 | 1.0 |
| Others | | | | | | | | |
| Non-linear index $n_2$ | 1.057 | 1.095 | 1.113 | 1.070 | 1.056 | 1.053 | 1.067 | CRYSTAL-LIZED |
| Index $n_d$ | 1.52039 | 1.52741 | 1.52372 | 1.52425 | 1.51566 | 1.51010 | 1.52173 | |
| CTE (20-300) | 82.7 | 61.9 | 62.1 | 62.2 | 70.7 | 59.8 | 59.2 | |
| Lifetime t | — | — | — | — | — | — | — | |
| Absorption @ 3000 nm | 0.480 | 0.710 | 0.745 | 0.632 | 0.324 | 0.439 | 0.840 | |
| Transformation Temp., Tg | 603 | 674 | 601 | 696 | 602 | 623 | 728 | |
| Wt. % $Nd_2O_3$ | 3.42 | 3.93 | 3.16 | 2.87 | 3.62 | 3.10 | 3.05 | |
| Cross Section | 3.00 | 2.40 | 2.48 | 2.74 | 2.82 | 2.30 | 2.04 | |
| Effective Linewidth | 27.74 | 29.15 | 28.68 | 29.08 | 28.11 | 29.17 | 30.44 | |

| Mole % | 57 | 58 | 59 | 60 |
|---|---|---|---|---|
| $P_2O_5$ | 62.6 | 57.5 | 68.5 | 52.5 |
| $Al_2O_3$ | 15.5 | 10.5 | 13.5 | 10.5 |
| $B_2O_3$ | 5.0 | | | 0.1 |
| $As_2O_3$ | 0.1 | 0.1 | 0.1 | 0.2 |
| $Nb_2O_5$ | 0.2 | 0.2 | | |
| $Li_2O$ | | | | |
| $Na_2O$ | | | | |
| $K_2O$ | | | 3.0 | |
| $Cs_2O$ | | | 2.0 | |
| MgO | 15.7 | | 12.0 | 25.7 |
| CaO | | | | |
| BaO | | | | |
| ZnO | | 30.7 | | 10.0 |
| $Ln_2O_3$ | 1.2 | 1.10 | 0.9 | 1.00 |
| Others | | | | |
| Non-linear index $n_2$ | 1.037 | 1.210 | 1.112 | 1.087 |
| Index $n_d$ | 1.51134 | 1.52529 | 1.51875 | 1.50439 |
| CTE (20-300) | 65.6 | 60.2 | 74.0 | 56.9 |
| Lifetime t | — | — | — | — |
| Absorption @ 3000 nm | 0.545 | 0.491 | 0.590 | 0.305 |
| Transformation Temp., Tg | 648 | 516 | 609 | 546 |
| Wt. % $Nd_2O_3$ | 2.08 | 3.26 | 2.87 | 3.12 |
| Cross Section | 2.43 | 2.42 | 2.86 | 2.30 |
| Effective Linewidth | 28.92 | 28.41 | 27.66 | 29.33 |

TABLE 2

| | LCP SERIES | | | | | | | |
|---|---|---|---|---|---|---|---|---|
| Mole % | LCP-1 | LCP-2 | LCP-3 | LCP-4 | LCP-5 | LCP-6 | LCP-7 | LCP-8 |
| $P_2O_5$ | 57.5 | 57.5 | 57.5 | 57.5 | 57.5 | 57.5 | 62.5 | 52.5 |
| $Al_2O_3$ | | 15.5 | 10.5 | 15.5 | 15.5 | 15.5 | 15.5 | 20.0 |
| $B_2O_3$ | 15.5 | 25.0 | | 5.0 | 5.0 | 20.0 | 20.0 | |
| $As_2O_3$ | 0.1 | 0.1 | 0.1 | 0.1 | 0.1 | 0.1 | 0.1 | 0.1 |
| $Nb_2O_5$ | 0.2 | 0.2 | 0.2 | 0.2 | 0.2 | 0.2 | 0.2 | 0.2 |
| $Li_2O$ | | | | | | | | |

TABLE 2-continued

| Mole % | LCP-1 | LCP-2 | LCP-3 | LCP-4 (LCP SERIES) | LCP-5 | LCP-6 | LCP-7 | LCP-8 |
|---|---|---|---|---|---|---|---|---|
| Na$_2$O | | | | | | | | |
| K$_2$O | | | | | | 5.0 | | |
| Cs$_2$O | | | | | | | | |
| MgO | 25.7 | 0.7 | 30.7 | 10.7 | | 0.7 | 0.7 | 35.7 |
| CaO | | | | | | | | |
| BaO | | | | | | | | |
| ZnO | | | | 10.0 | 20.7 | | | |
| Ln$_2$O$_3$ | 1.0 | 1.07 | 1.0 | 1.0 | 1.0 | 1.0 | 1.0 | 1.0 |
| Non-linear index n$_2$ | 1.047 | 1.028 | 1.032 | 1.105 | 1.251 | | | |
| Refractive Index n$_d$ | 1.51211 | 1.51790 | 1.50103 | 1.51132 | 1.52421 | 1.52436 | 1.52436 | 1.49569 |
| CTE (20-300) | 67.5 | 53.9 | 61.1 | 54.5 | 56.5 | 66.1 | 58.2 | |
| Lifetime | — | — | — | — | — | — | — | |
| Absorption @ 3000 nm | | | 0.305 | 0.489 | 0.451 | 0.680 | 0.716 | |
| Transformation Temp., Tg | 641 | >750 | 587 | 600 | 589 | 688 | >750 | |
| Wt. % Nd$_2$O$_3$ | 3.54 | 3.30 | 3.03 | 3.08 | 3.13 | 3.07 | 3.33 | |
| Cross Section | 2.38 | 1.93 | 2.45 | 2.27 | 2.15 | 2.50 | 2.22 | 2.38 |
| Effective Linewidth | 29.47 | 30.99 | 28.90 | 29.15 | 29.03 | 28.87 | 29.97 | 29.43 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Figure 1C:
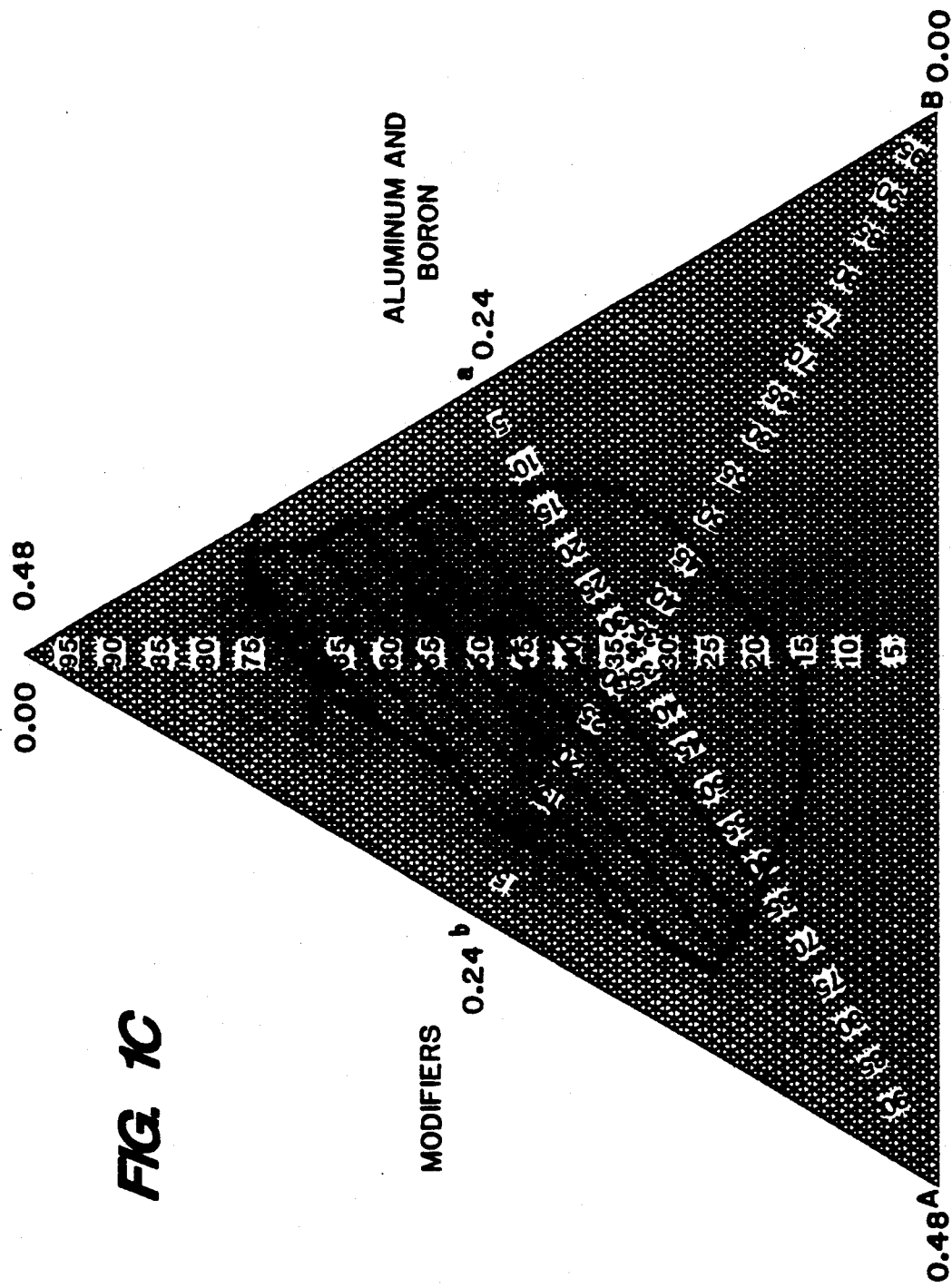
Figure 1D:
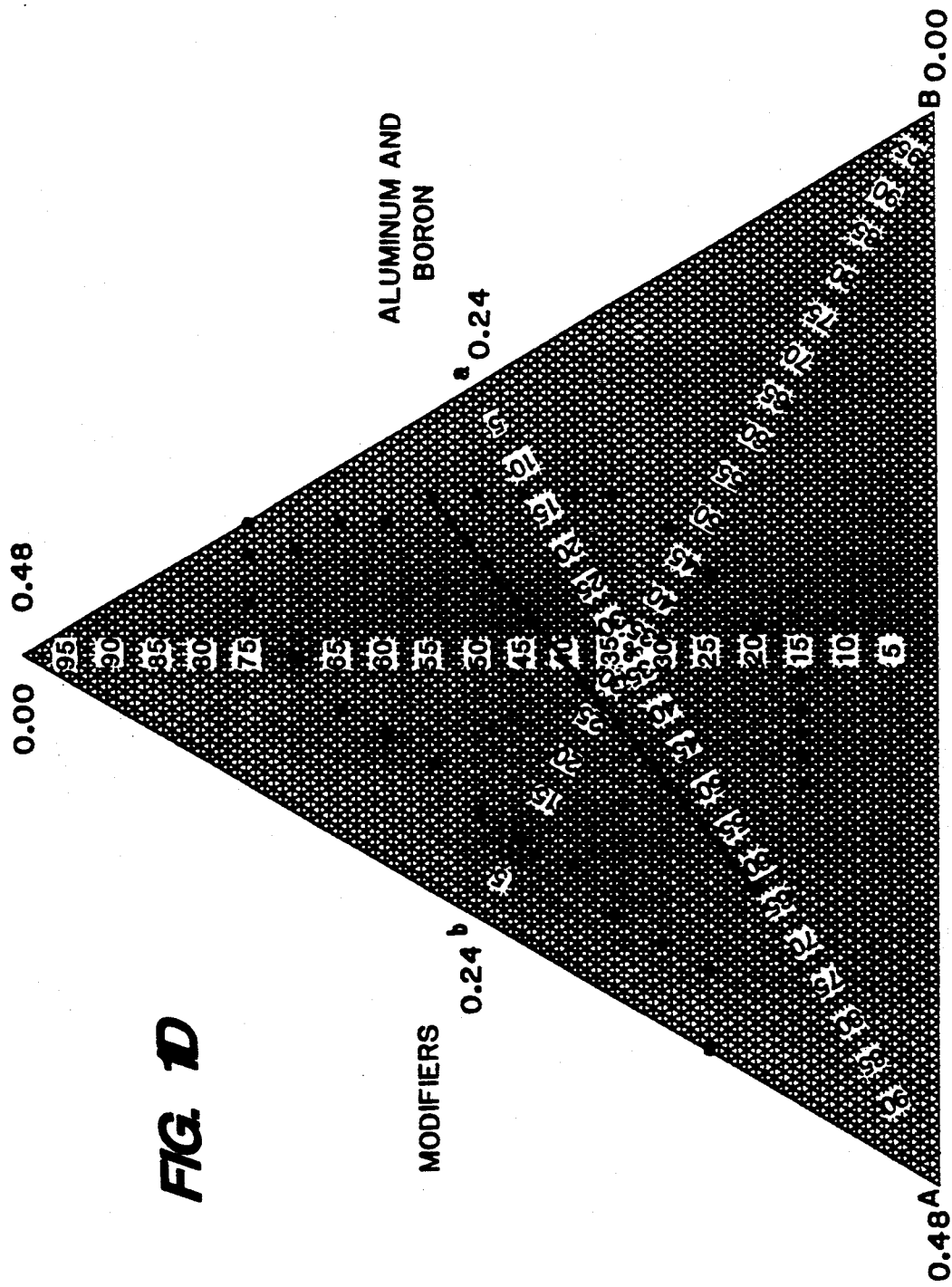

What is claimed is:

1. A low- or no-silica, low- or no-alkali phosphate glass useful as a laser amplifier in a multiple pass, high energy laser system having a high thermal conductivity, $K_{90°\,C.} > 0.85$ W/mK, a low coefficient of thermal expansion, $\alpha_{20°-300°\,C.} < 80 \times 10^{-7}/°$ C., low emission cross section, $\alpha < 2.5 \times 10^{-20}$ cm$^2$, and a high fluorescence lifetime, $\tau > 325$ μsecs at 3 wt. % Nd (or equivalent) doping, consisting essentially of (on an oxide composition basis):

| | Mole % |
|---|---|
| P$_2$O$_5$ | 52-72 |
| Al$_2$O$_3$ | 0-<20 |
| B$_2$O$_3$ | >0-25 |
| ZnO | 0-31 |
| Li$_2$O | 0-5 |
| K$_2$O | 0-5 |
| Na$_2$O | 0-5 |
| Cs$_2$O | 0-5 |
| Rb$_2$O | 0-5 |
| MgO | >0-<30 |
| CaO | 0-20 |
| BaO | 0-20 |
| SrO | 0-<20 |
| Sb$_2$O$_3$ | 0-<1 |
| As$_2$O$_3$ | 0-<1 |
| Nb$_2$O$_5$ | 0-<1 |
| Ln$_2$O$_3$ | up to 6.5 |
| PbO | 0-<5 |
| SiO$_2$ | 0-3 | wherein
Ln$_2$O$_3$ is the sum of lanthanide oxides;
R being Li, Na, K, Cs, and Rb; and said glass substantially corresponds to a point within the upper lined portion of FIG. 1C.

2. A low- or no-silica, low- or no-alkali phosphate glass useful as a laser amplifier in a multiple pass, high energy laser system having a high thermal conductivity, $K_{90°\,C.} > 0.85$ W/mK, a low coefficient of thermal expansion, $\alpha_{20°-300°\,C.} < 80 \times 10^{-7}/°$ C., low emission cross section, $\sigma < 2.5 \times 10^{-20}$ cm$^2$, and a high fluorescence lifetime, $\tau > 325$ μsecs at 3 wt. % Nd doping, consisting essentially of (on an oxide composition basis):

| | Mole % |
|---|---|
| P$_2$O$_5$ | 52-72 |
| Al$_2$O$_3$ | 0-<20 |
| B$_2$O$_3$ | >0-25 |
| ZnO | 0-31 |
| Li$_2$O | 0-5 |
| K$_2$O | 0-5 |
| Na$_2$O | 0-5 |
| Cs$_2$O | 0-5 |
| Rb$_2$O | 0-5 |
| MgO | >0-<30 |
| CaO | 0-20 |
| BaO | 0-20 |
| SrO | 0-<20 |
| Sb$_2$O$_3$ | 0-<1 |
| As$_2$O$_3$ | 0-<1 |
| Nb$_2$O$_5$ | 0-<1 |
| Ln$_2$O$_3$ | up to 6.5 |
| PbO | 0-<5 |
| SiO$_2$ | 0-3 |

Ln$_2$O$_3$ is the sum of lanthanide oxides;
R being Li, Na, K, Cs, and Rb;
the sum of Al$_2$O$_3$ and MgO is <24 unless $\Sigma$ R$_2$O is 0, then the sum of Al$_2$O$_3$ and MgO is <42; and
the ratio of MgO to B$_2$O$_3$ is 0.48-4.20.

3. A glass according to claim 2, wherein, R$^1$ being Ba, Mg, Ca, Sr, Pb and Zn if P$_2$O$_5$ is $\geq$60 and $\Sigma$ R$_2$O is 0, then the sum of Al$_2$O$_3$, B$_2$O$_3$, and R$^1$O is <30.4,.

4. A glass according to claim 2, wherein the sum of Al$_2$O$_3$ and MgO is >9.1.

5. A glass according to claim 2, wherein the sum of MgO and ZnO is 0.0–48.

6. A glass according to claim 2, wherein the sum of $Al_2O_3$, MgO, and ZnO is >14.3 and <46.2.

7. A glass according to claim 2, wherein the sum of $P_2O_5$, $Al_2O_3$, $B_2O_3$, MgO, and ZnO is ≧88.

8. A glass according to claim 2, wherein the sum of $Al_2O_3$, $B_2O_3$, and MgO is >10.5 and <46.2.

9. A glass according to claim 2, wherein $\Sigma R_2O$ is 0.0.

10. A glass according to claim 2, wherein $R^4$ being Ba, Mg, Ca, Sr, Pb and Zn, and $R^2$ being Al, B and Ln of $R^1O$ and $R^2_2O_3$ is >28.8 and <46.2.

11. A glass according to claim 2, wherein the sum of $Al_2O_3$ and $B_2O_3$ is >9.1 and <30.5.

12. A glass according to claim 2, wherein the sum of $Al_2O_3$, $B_2O_3$, and ZnO is >10.5 and <41.2.

13. A glass according to claim 2, wherein the amount of $Al_2O_3$ is 4–<20.

14. A glass according to claim 2, wherein $\Sigma R^2_2O_3$ is 10–40 and $R^2$ is Al, B and Ln.

15. A glass according to claim 1, wherein the ratio of $P_2O$ to $Al_2O_3$ is 3.5–7.5.

16. A glass according to claim 2, wherein $\alpha_{20°-300°\,C.}$ is $<75\times10^{-6}/°$ C.

17. A glass according to claim 2, wherein the index of refraction, $n_d$, is <1.530.

18. A glass according to claim 2, wherein the index of refraction, $n_d$, is <1.510.

19. A glass according to claim 2, wherein the nonlinear index, $n_2$, is <1.10.

20. A glass according to claim 2, wherein the effective linewidth, $\Delta\lambda$ eff, is about 27.0–30.5 nm.

21. A low- or no-silica, low- or no-alkali phosphate glass useful as a laser amplifier in a multiple pass, high energy laser system having a high thermal conductivity, $K_{90°\,C.}>0.85$ W/mK, a low coefficient of thermal expansion, $\alpha_{20°-300°\,C.}<80\times10^{-7}/°$ C., low emission cross section, $\sigma<2.5\times10^{-20}$cm$^2$, and a high fluorescence lifetime, $\tau>325$ μsecs at 3 wt. % Nd doping, consisting essentially of (on an oxide composition basis):

| | Mole % |
|---|---|
| $P_2O_5$ | 52–72 |
| $Al_2O_3$ | 0–<20 |
| $B_2O_3$ | >0–25 |
| ZnO | 0–31 |
| $Li_2O$ | 0–5 |
| $K_2O$ | 0–5 |
| $Na_2O$ | 0–5 |
| $Cs_2O$ | 0–5 |
| $Rb_2O$ | 0–5 |
| MgO | >0–<30 |
| CaO | 0–20 |
| BaO | 0–20 |
| SrO | 0–<20 |
| $Sb_2O_3$ | 0–<1 |
| $As_2O_3$ | 0–<1 |
| $Nb_2O_5$ | 0–<1 |
| $Ln_2O_3$ | up to 6.5 |
| PbO | 0–<5 |
| $SiO_2$ | 0–3 | wherein
$Ln_2O_3$ is the sum of lanthanide oxides;
R being Li, Na, K, Cs, and Rb;
if $\Sigma R_2O$ is >0, then the sum of MgO and ZnO is ≦10; and
the ratio of MgO to $B_2O_3$ is 0.48–4.20.

22. A glass according to claim 16, wherein if $P_2O_5$ is ≧60 and $\Sigma R_2O$ is 0, then the sum of $Al_2O_3$, $B_2O_3$, and $R^1O$ is <30.4, $R^1$ being Ba, Mg, Ca, Sr, Pb and Zn.

23. A low- or no-silica, low- or no-alkali phosphate glass useful as a laser amplifier in a multiple pass, high energy laser system having a high thermal conductivity, $K_{90°\,C.}>0.85$ W/mK, a low coefficient of thermal expansion, $\alpha_{20°-300°\,C.}<80\times10^{-7}/°$ C., low emission cross section, $\sigma<2.5\times10^{-20}$cm$^2$, and a high fluorescence lifetime, $\tau>325$ μsecs at 3 wt. % Nd doping, consisting essentially of (on an oxide composition basis):

| | Mole % |
|---|---|
| $P_2O_5$ | 52–72 |
| $Al_2O_3$ | 0–<20 |
| $B_2O_3$ | 5–25 |
| ZnO | 0–31 |
| $Li_2O$ | 0–5 |
| $K_2O$ | 0–5 |
| $Na_2O$ | 0–5 |
| $Cs_2O$ | 0–5 |
| $Rb_2O$ | 0–5 |
| MgO | >0–<30 |
| CaO | 0–20 |
| BaO | 0–20 |
| SrO | 0–<20 |
| $Sb_2O_3$ | 0–<1 |
| $As_2O_3$ | 0–<1 |
| $Nb_2O_5$ | 0–<1 |
| $Ln_2O_3$ | up to 6.5 |
| PbO | 0–<5 |
| $SiO_2$ | 0–3 | wherein
$Ln_2O_3$ is the sum of lanthanide oxides;
$\Sigma R_2O$ is <5, R being Li, Na, K, Cs, and Rb;
the sum of $Al_2O_3$ and MgO is <24 unless $\Sigma R_2O$ is 0, then the sum of $Al_2O_3$ and MgO is <42; and
the ratio of MgO to $B_2O_3$ is 0.48–4.20.

24. A low- or no-silica, low- or no-alkali phosphate glass useful as a laser amplifier in a multiple pass, high energy laser system having a high thermal conductivity, $K_{90°\,C.}>0.85$ W/mK, a low coefficient of thermal expansion, $\alpha_{20°-300°\,C.}<80\times10^{-7}/°$ C., low emission cross section, $\sigma<2.5\times10^{-20}$cm$^2$, and a high fluorescence lifetime, $\tau>325$ μsecs at 3 wt. % Nd doping, consisting essentially of (on an oxide composition basis):

| | Mole % |
|---|---|
| $P_2O_5$ | 52–72 |
| $Al_2O_3$ | 0–<20 |
| $B_2O_3$ | >0–25 |
| ZnO | 5–31 |
| $Li_2O$ | 0–5 |
| $K_2O$ | 0–5 |
| $Na_2O$ | 0–5 |
| $Cs_2O$ | 0–5 |
| $Rb_2O$ | >0–5 |
| $\epsilon R_2O$ | <5 |
| MgO | >0–<30 |
| CaO | 0–20 |
| BaO | 0–20 |
| SrO | 0–<20 |
| $Sb_2O_3$ | 0–<1 |
| $As_2O_3$ | 0–<1 |
| $Nb_2O_5$ | 0–<1 |
| $Ln_2O_3$ | up to 6.5 |
| PbO | 0–<5 |
| $SiO_2$ | 0–3 | wherein
$Ln_2O_3$ is the sum of lanthanide oxides;
R being Li, Na, K, Cs, and Rb;

the sum of $Al_2O_3$ and MgO is <24 unless $\Sigma R_2O$ is 0, then the sum of $Al_2O_3$ and MgO is <42; and.

the ratio of MgO to $B_2O_3$ is 0.48-4.20.

25. A glass according to claim 2, wherein the ratio of MgO to $B_2O_3$ is 0.48-4.20.

26. A glass according to claim 1, wherein $Ln_2O_3$ includes $Nd_2O_3$ as a lasing species.

27. A glass according to claim 2, wherein $Ln_2O_3$ includes $Nd_2O_3$ as a lasing species.

28. A glass according to claim 1, wherein said glass composition further contains 0.1-1.5 wt. % antisolarants.

29. A glass according to claim 2, wherein said glass composition further contains 0.1-1.5 wt. % antisolarants.

30. A glass according to claim 1, wherein the $SiO_2$ content is zero.

31. A glass according to claim 2, wherein the $SiO_2$ content is zero.

32. A glass according to claim 21, wherein the $SiO_2$ content is zero.

33. A glass according to claim 23, wherein the $SiO_2$ content is zero.

34. A glass according to claim 24, wherein the $SiO_2$ content is zero.

* * * * *

UNITED STATES PATENT AND TRADEMARK OFFICE
CERTIFICATE OF CORRECTION

PATENT NO. : 5,173,456

DATED : December 22, 1992

INVENTOR(S) : Yuiko HAYDEN ET AL.

It is certified that error appears in the above-identified patent and that said Letters Patent is hereby corrected as shown below:

Claim 1; Col. 19; Line 59: Directly under ($Rb_2O$) and (0-5) Insert -- $\leq R_2O$ -- and -- $\leq 5$ --

Claim 2; Col. 20; Line 47: Directly under ($Rb_2O$) and (0-5) Insert -- $\leq R_2O$ -- and -- $\leq 5$ --

Claim 3; Col. 20; Line 66: Delete (,) after 4

Claim 10; Col. 21; Line 11: Delete ($R^4$) Insert -- $R^1$ --

Claim 10; Col. 21; Line 13: Insert -- the sum -- before of

Claim 16; Col. 21; Line 25: After 10- delete (6) Insert -- 7 --

Claim 21; Col. 21; Line 54: Directly under ($Rb_2O$) and (0-5) Insert -- $\leq R_2O$ -- and $\leq 5$ --

Claim 23; Col. 22; Line 24: Directly under ($Rb_2O$) and (0-5) Insert -- $\leq R_2O$ -- and -- $\leq 5$ --

Claim 23; Col. 22; Line 33: Delete ($\leq R_2O$ is $\leq 5$

Claim 24; Col. 22; Line 56: Change ($E$) to -- $\leq$

Signed and Sealed this

Fourth Day of January, 1994

Attest:

BRUCE LEHMAN

*Attesting Officer*  Commissioner of Patents and Trademarks